RECORD MAGAZINE AND DRIVE THEREFOR

Filed April 10, 1957 4 Sheets-Sheet 1

INVENTOR.
LYNDON A. DURANT
BY
Lloyd J. Andres

Oct. 20, 1959 L. A. DURANT 2,909,373

RECORD MAGAZINE AND DRIVE THEREFOR

Filed April 10, 1957 4 Sheets-Sheet 2

INVENTOR.
LYNDON A. DURANT
BY

Oct. 20, 1959 L. A. DURANT 2,909,373

RECORD MAGAZINE AND DRIVE THEREFOR

Filed April 10, 1957 4 Sheets-Sheet 3

INVENTOR.
LYNDON A. DURANT
BY
Lloyd J. Andres

RECORD MAGAZINE AND DRIVE THEREFOR

Filed April 10, 1957 4 Sheets-Sheet 4

INVENTOR.
LYNDON A. DURANT
BY
Lloyd J. Linder 2,909,373

RECORD MAGAZINE AND DRIVE THEREFOR

Lyndon A. Durant, Chicago, Ill., assignor to United Music Corporation, Chicago, Ill., a corporation of Illinois Application April 10, 1957, Serial No. 651,991

9 Claims. (Cl. 274—10)

This invention relates in general to phonograph record players and more particularly to a circular rotary magazine for a multi-selective record player for retaining a relatively large plurality of disc records in radial spaced relation with their outer edges describing a torus ring, including means for rotating and indexing said magazine in a like plurality of positions.

Reference is made to my pending U.S. application, Serial No. 447,991, now abandoned.

Rotary record magazines prior to this invention, because of their inherent large size, are necessarily rotated at a relatively low speed because of the high inertia forces which when uncontrolled, mitigate against accurate registration when the magazine is suddenly friction stopped at a record playing position. When such a magazine is driven at suitable speed excessive time is consumed between the playing of successively selected records. Furthermore, magazines of this general character usually require additional fastening or holding means for retaining each record in accurate alignment against the action of gravity, which means often damage the playing surface of the records, when transferred to and from their stored positions.

The present magazine and drive therefor overcomes the above objections and disadvantages by the provisions of a construction in which gravity serves to hold each record in an accurate predetermined position by its outer edge only and the provisions of an automatic two speed drive and registration means provides for rapid rotation, and accurate stopping of the magazine at any registration position for the unhampered transfer of any preselected record, with a minimum of elapsed time.

A principal object of the invention resides in a magazine structure for retaining therein a plurality of disc records in radially spaced relation with their outer edges describing a torus ring. Said magazine adapted to rotate about the axis of said ring whereby each record may be accurately registered and stopped at each of two predetermined fixed record transfer positions.

Another object of the invention is the provisions of a torus shaped magazine structure in which each of the records are retained by gravity on a three point suspension means without lateral supporting pockets therein providing for simple unhampered manual removal and replacement.

Another object of the invention is the provision of a motor driven two speed friction transmission for rotating said magazine including electromagnetic means for stopping and accurately registering and stopping each record at each of two transfer positions and for shifting said transmission to change the rotational speed of said magazine from a high to a low speed immediately prior to said registration.

A further object of the invention is the provision of a motor driven two speed friction drive means associated with a rotary magazine for normally driving same at a predetermined high speed including electromagnetic means responsive to an electric circuit for simultaneously activating said low speed drive means and said indexing means when a preselected record has reached a predetermined position near to a transfer position.

These and other objects and advantages in one embodiment of the invention are described and shown in the following specification and drawings in which.

Figure 1:
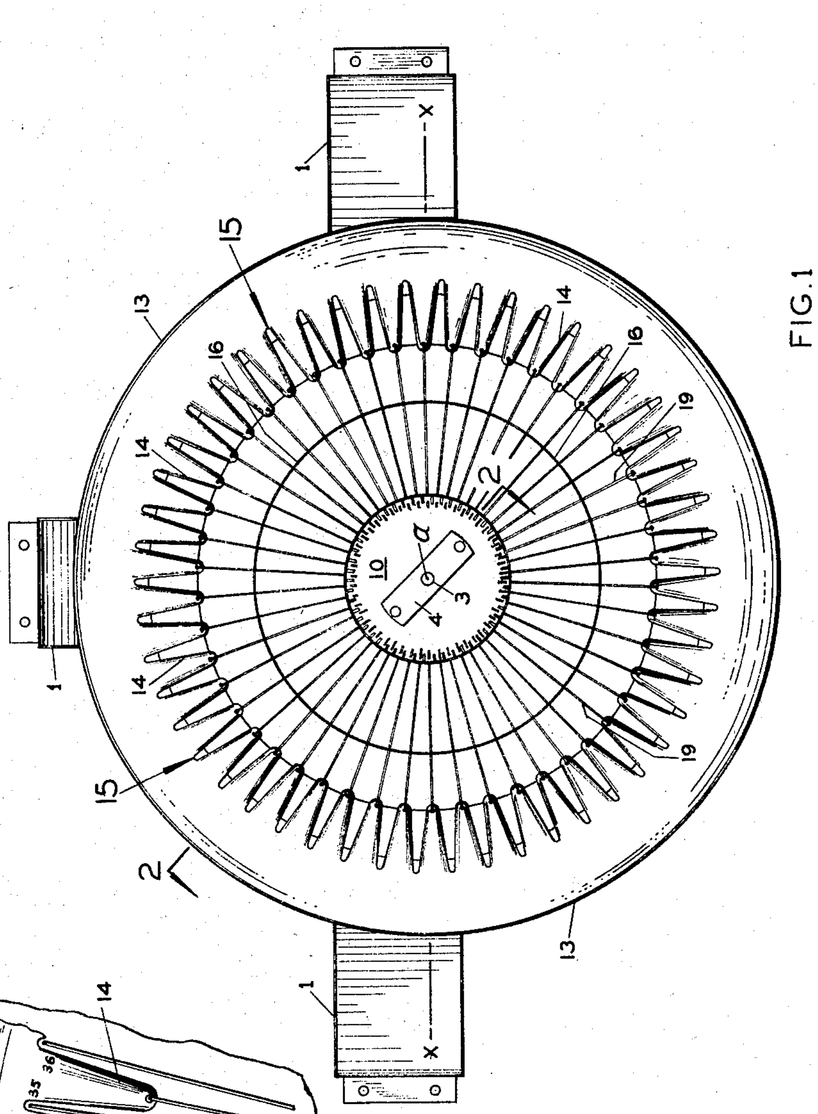
Fig. 1 is a front elevation of the magazine in reduced scale.
Figure 2:
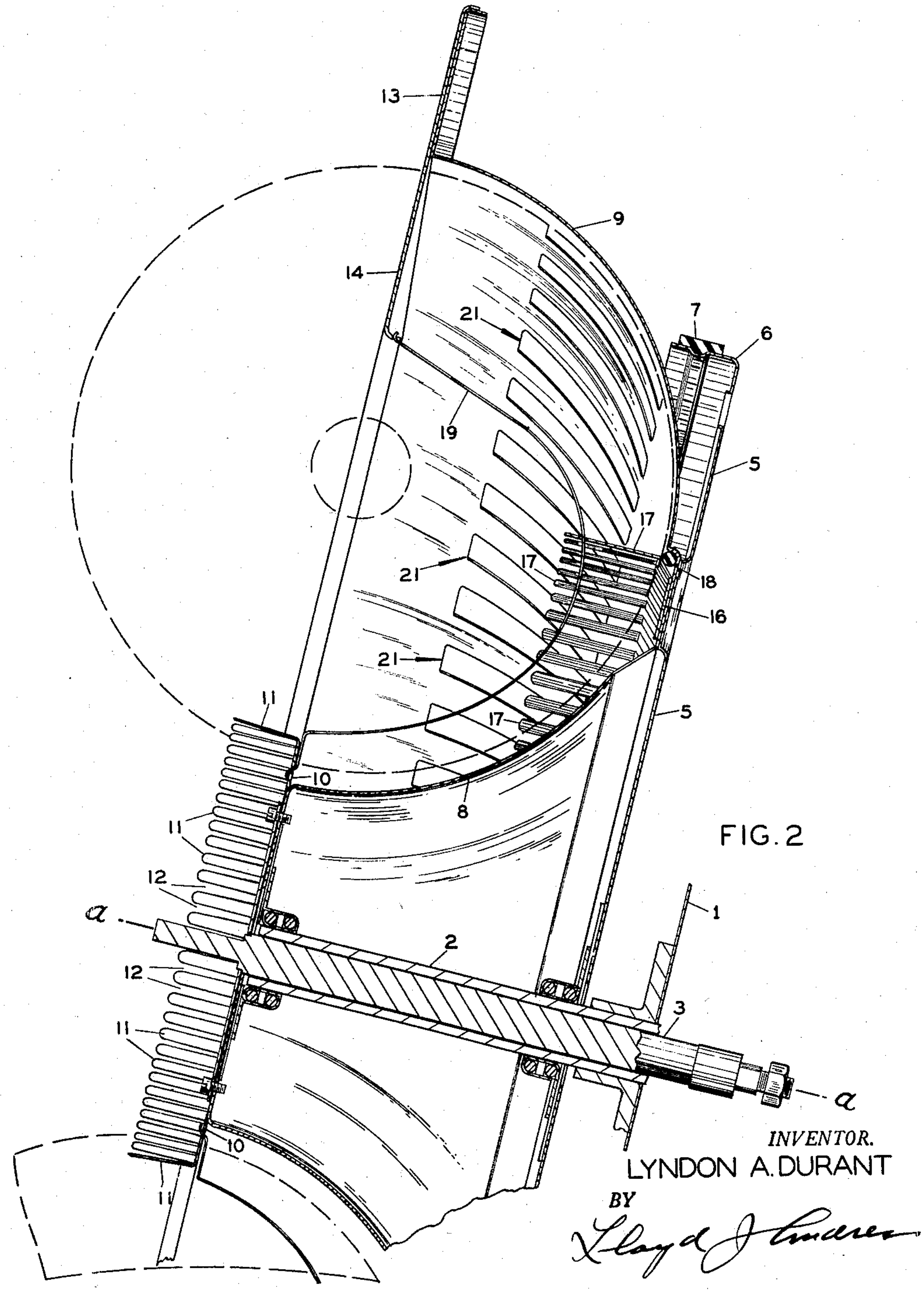
Fig. 2 is a cross sectional side view of the magazine taken along section line 2—2, Fig. 1.

Referring to Figs. 1 and 2, the magazine is preferably an assembly of stampings made from relatively light gauge sheet metal for obtaining a high degree of rigidity and relatively light weight. This light weight construction minimizes undesirable inertia forces when the magazine is suddenly stopped and started at its record transfer positions.

The entire magazine assembly is supported in a frame member 1 on a hollow shaft 2 secured to said frame. A coaxial internal shaft 3 is adapted for rotation with the magazine by means of a coupling 4 attached thereto for cooperation with a selector mechanism not shown.

The frame 1 and the shaft 2 is tilted a predetermined angle from horizontal for retaining the records in the magazine by gravity.

A main disc 5 is provided with a flange 6 around its outer periphery on which is secured a circular endless tire 7 responsive to a friction drive to be hereinafter described.

Circular inner and outer members 8 and 9 are coaxially secured to disc 5 as shown and form a semi-toroidal cavity for retaining disc records in uniform radially spaced positions. Member 8 also provides a hub to which is coaxially secured an inner record support 10 having a plurality of spacer fingers 11 extended outward therefrom which provides tapered slots 12 therebetween for guiding and supporting the inner edges of the records.

A circular outer record support 13 is coxially secured to member 9 and has projecting fingers 14 providing radially tapered slots 15, corresponding with slots 12, for guiding and supporting the outer edges of the records. Each finger 14 also serves as an index for designating each side of each record as illustrated in Fig. 3 by numbers (27 to 36 inclusive).

A circular mid-position record guide member 16 is coaxially secured to disc 5 as shown and is provided with forward projecting fingers 17 positioned in radial alignment with the fingers 11 and 14. A record bumper support 18 in the form of a circular endless ring, preferably of rubber, is retained between the outer edge of member 16 and a coaxial groove in member 9. Thus the ring is positioned to intersect the inner ends of the slots between the fingers 17.

Figure 3:
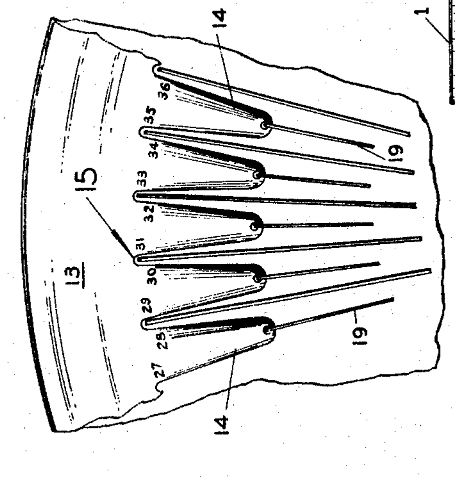
Fig. 3 is an enlarged fragmentary view of an indices portion of the magazine shown Fig. 1.

Formed wire members 19 are supported at their inner ends in appropriate holes in fingers 11, and their outer ends retained in appropriate holes in fingers 14, also shown in Fig. 3. Each wire member 19 is also supported in appropriate holes in the inner ends of fingers 17, and serve as a support for each finger 14 and also as a divider between adjacent record positions to facilitate loading records in the magazine.

It is now apparent that each record may be readily removed and replaced in each position in the radially aligned slots previously described by gravity alone. Thus the magazine will retain the records with their edges in proper torus alignment parallel to the axis of the magazine during the rotation thereof by virtue of the three points of support previously described. When each record is in its lower position it will gravitate against the outer record support 13 at one point and against the mid support 18 and when the record is in its upper position, it will gravitate against the inner record support 10 and the mid support 18.

The magazine in this embodiment provides for the retention of fifty records in one side thereof. However, it is apparent that the same construction is useful for greater or lesser number of records.

Figure 4:
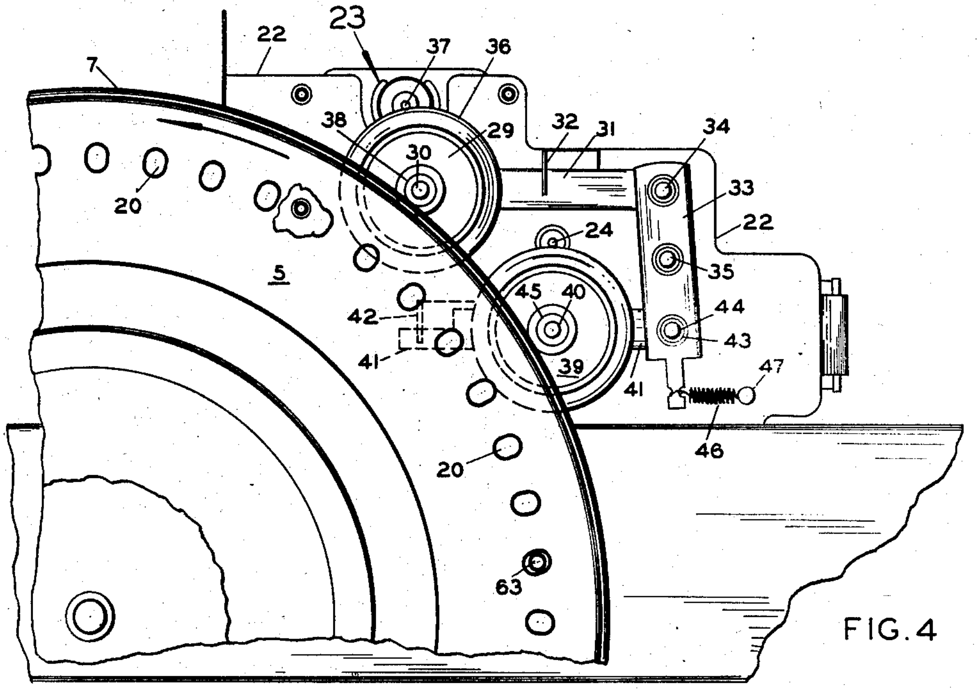
Fig. 4 is a fragmentary rear elevation of the magazine shown Fig. 1 showing the drive therefor.

Since this magazine is intended for use in an automatic self-indexing record player, the main disc 5 is provided with a number of inner equi-spaced coaxially positioned holes 20 having flanged abutments, shown in Fig. 4 and corresponding in number and position to the record positions in the magazine. There is also a like number of clearance apertures 21 in member 9, Fig. 7, for the free passage of transfer elements not shown.

Figure 6:
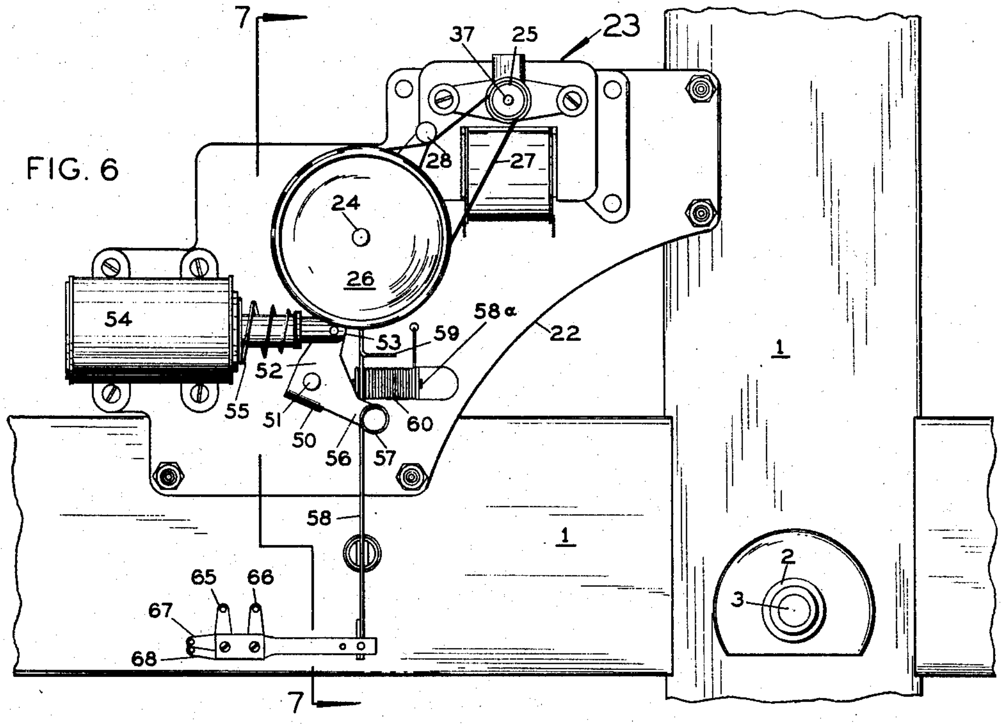
Fig. 6 is a rear elevation of the drive mechanism shown Fig. 4.

Referring to Fig. 6, the magazine drive and speed shifter assembly is mounted on a plate 22 and retained to frame 1 by suitable fasteners as shown.

An electric motor 23 secured to plate 22 is adapted to drive a jack shaft 24 journalled therein by means of pulleys 25 and 26, belt 27 and idler assembly 28.

Referring to Fig. 4, a two step idler wheel 29 is journalled for rotation on a shaft 30 secured on a link 31 which is retained laterally by a fixed guide 32 integral with plate 22. The end of link 31 is pivoted on a toggle lever 33 by stud 34 which in turn is pivoted for oscillation on plate 22 by a stud 35. The wheel 29 is provided with a rubber tire 36 around its outer periphery for friction driving contact with a motor shaft 37, a friction drive wheel 38 integral with wheel 29 is shown in driving contact with the tire 7 on main disc 5 of the magazine. Thus the idler wheel in position shown in Fig. 4 will drive the magazine in a direction shown by arrow, at a predetermined high speed when the motor 23 is energized.

A second idler wheel 39, same as 33, is journalled for rotation on a stud 40 supported by a link 41 laterally retained by a guide 42 integral with plate 22. The link 41 is pivotally retained to a bushing 43 secured in lever 33 by a fixed shaft 44.

The inner end of jack shaft 24 is positioned to rotate wheel 39 by frictional contact therewith. A friction drive wheel 45 integral with wheel 39 is adapted to engage and drive the tire 7. A spring 46 secured to lever 33 and anchored to a stud 47 normally urges wheel 29 and wheel 38 into driving contact with motor shaft 37 and tire 7 respectively, and conversely, drive wheel 45 is held out of engagement with tire 7 as shown in Fig. 4.

Figure 7:
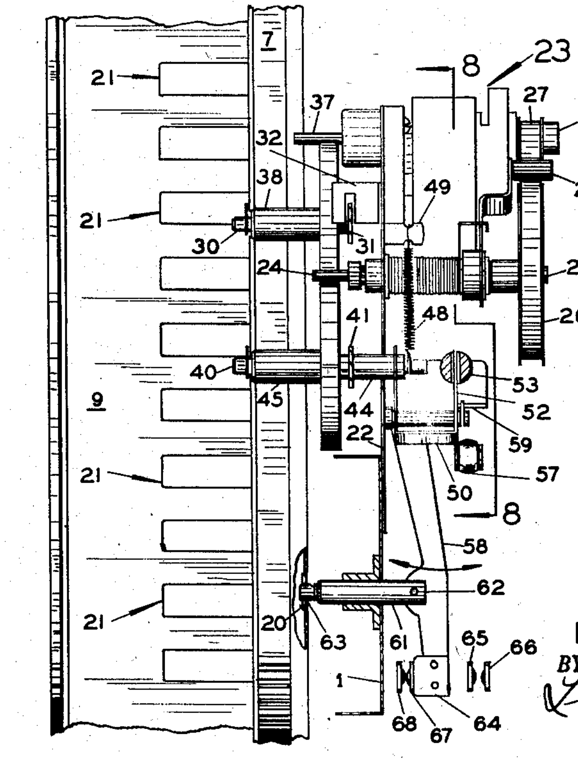
Fig. 7 is a cross sectional side elevation taken through section line 7—7, Fig. 6.

Referring to Fig. 7, a spring secured to the outer end of shaft 44 and anchored to a lug 49 in plate 22 is provided to overcome gravitational contact of wheel 45 with the tire 7.

Referring to Figs. 6 and 7, a rocker 50 is pivoted for movement on a stud 51 fixed in plate 22 and a leg 52 thereof is loosely pinned to the plunger 53 of electric solenoid 54. A compression spring 55 around plunger 53 normally urges rocker 50 into the position shown in Fig. 6 when solenoid 54 is de-energized.

A leg 56 of rocker 50 carries a roller 57 on its outer end for retracting bell crank lever 58 by upward engagement with an offset end 59 thereof. Lever 58 is pivoted on a pin **58*a* supported by lugs integral with plate 22 for oscillatory movement normal to said plate, as shown. A torsion spring 60 around the pin and engaged with lever 58 and plate 22** normally urges the lever into position shown in Fig. 7.

A magazine registration plunger 61 is loosely secured to lever 58 by pin 62 as shown. The outer end 63 of the plunger is adapted to engage each hole 20 registered therewith in contact with the flange surrounding each hole in disc 5, when reciprocated by movement of lever 58 as shown by arrow, as indicated in Fig. 4.

The lower insulating end 64 of lever 58 is positioned to alternately operate electric switches 65—66 and 67—68 when the lever is moved to each of its two positions.

Figure 8:
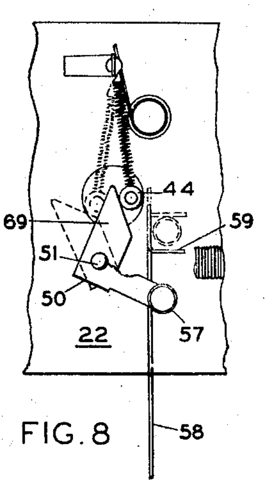
Fig. 8 is a cross sectional view taken generally along section line 8—8, Fig. 7.

Referring to Figs. 7 and 8, an inner leg 69 of rocker 50 is shaped to cam against shaft 44 whereby the end 59 of lever 58, and shaft 44 will simultaneously move from the position shown in full lines to the position shown in dotted lines, Fig. 8, when the rocker is oscillated by solenoid 54 and spring 55.

In operation, and assuming that fifty disc records are placed in the magazine shown in Fig. 1, and each record positioned as shown in Fig. 2, then the magazine may be rotated about its axis on shaft 2 with the outer edge of each record maintaining a position within a torus ring and each record may be moved to a position in either left or right register coplanar with the plane *x—x*, Fig. 1, which plane intersects axis *a—a* shown in Figs. 1 and 2.

Referring to Figs. 6 and 7, and assuming the switch 65—66 is closed and motor 23 and solenoid 54 are energized, then the drive element will be in position shown in Fig. 4 and the magazine rotated at its "high" speed in direction shown by arrow by virtue of the friction engagement of wheels 29 and 38 in engagement with motor shaft 37 and the tire 7 respectively. Under these conditions the end 63 of the plunger 61 will be withdrawn from registration in a pre-selected hole 20 by the spring driven movement of lever 58.

Figure 5:
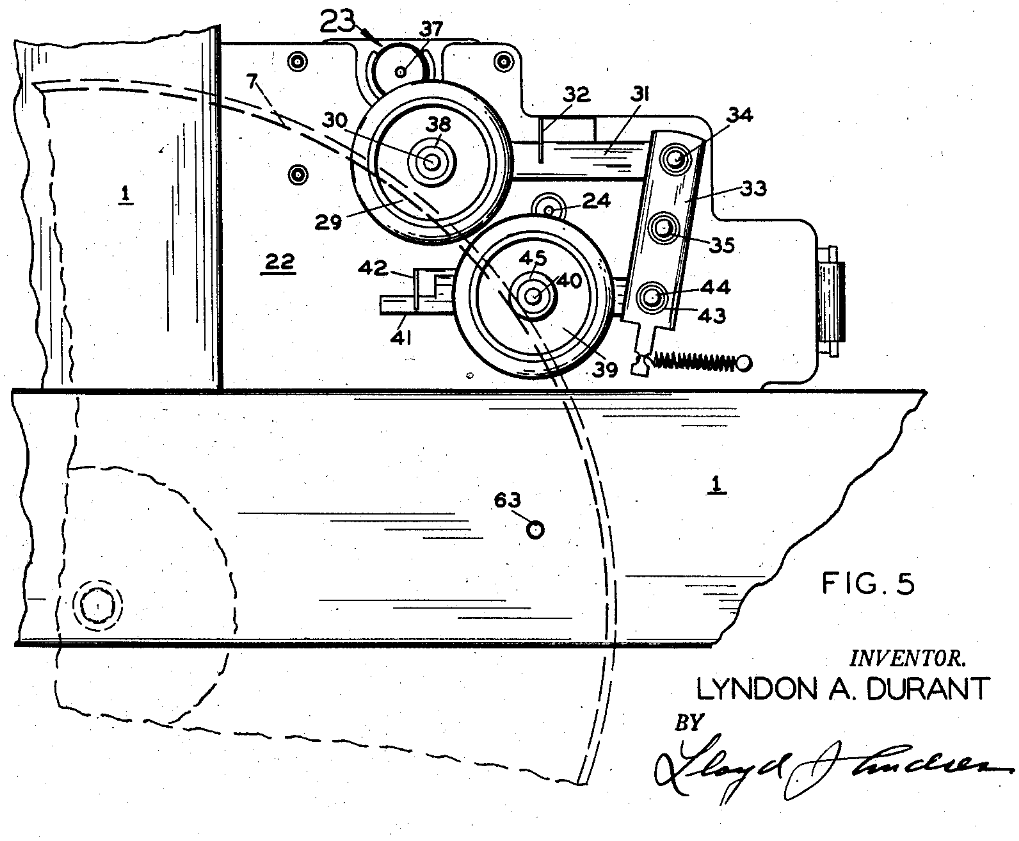
Fig. 5 is the same as Fig. 4 with elements in changed position.

When a selected record approaches registration at either the left or right registration position *x—x*, Fig. 1, then by means of the operation of a commutator selector device, not shown, responsive to the rotation of shaft 3 the solenoid 54 will be de-energized before the plunger 61 is in register with a corresponding hole 20 in the disc 5. Then the spring 55 on the solenoid plunger will shift the rocker 50 and move the drive elements to the position shown in Fig. 5, with the wheel 39 driven by shaft 24 in engagement with tire 7 and the wheel 29 idle.

Since the shaft 24 driving wheel 39 is running at approximately one-half motor speed by virtue of the belt reduction, the resultant lower speed of friction wheel 45 in contact with tire 7 immediately reduces the rotational speed of the magazine without shock or slippage.

It is to be noted that upon repetition this shift in speed will be constant without compensation for wear since it has been found that the shift will be accompanied by momentary acceleration of the motor during the short period required for the absorption of inertia forces in the magazine.

Simultaneously during the above described shift of rocker 50 roller 57 thereon will disengage from the end 59 of the lever 58 and permit the spring 60 to project the end 63 of plunger 61 against the outer surface of disc 5 whereby the now "slow" moving magazine will gently register the selected hole 20 with the said plunger and the end thereof will move into said hole under the influence of spring 60 and be retained therein by the abutting flange around each hole.

Simultaneously the lever 58 will open switch 65—66 connected to a control circuit means, not shown, which in turn will de-energize motor 23 and the switch 67—68 will energize another circuit not shown for initiating a record transfer means not shown. In practice when a magazine of the character described is used in a coin operated phonograph the latter can be constructed to occupy a relatively small floor space and by virtue of the automatic two speed drive and indexing means therefor, a substantial saving in time is made between the play of selected records since the ratio of angular magazine velocity from normal rotation to indexing rotation may be in the order of ten to one with a safe maximum indexing velocity of one r.p.m.

The above operation may be selectively repeated to bring any one of the records in the magazine to either side of the registration plane *x—x* for playing both sides thereof in a minimum of elapsed time and without shock.

It is to be noted that the apertures 21 in the magazine member 9 are positioned with respect to holes 20 to permit the free passage of record transfer arms, not shown, through each side of the magazine in the path of each record registered in plane *x—x* for transfer of a selected record to a turntable.

Having described my invention, I claim:

1. A record player magazine having means for retaining and rotating a plurality of like disc records in radial spaced relation about a fixed principal axis with said axis tilted a predetermined angle from horizontal comprising a circular main housing journalled for rotation about said axis and shaped to retain said records in one side thereof, a circular central record support on said one side of said housing co-axial and normal to said axis, a circular outer support on said one side in concentric spaced relation to said central record support, a circular mid-position support on said one side positioned concentric with and spaced between said other supports and displaced a predetermined axial distance therefrom, each said record support having a plurality of equi-spaced different projections therein positioned in radial alignment with said axis forming a like plurality of slots therebetween with each of said slots in each said support in said alignment for supporting each said record therein by three spaced portions of its edge, each of said record supports axially positioned on said housing to retain by gravity said records in one side of said magazine for rotation in uniform spaced relation equi-distant from and about said axis with their sides adjacent each other and parallel said axis when said magazine is rotated and to permit the edgewise transfer of each said record from the said side of said magazine.

2. The structure is recited in claim 1 including a frame member in said magazine positioned in radial position with respect to said axis and secured in the outer end of each of said different radially aligned projections for reinforcing said projections in said outer record support and for visually guiding each said record when inserted in said slots in said magazine.

3. A record player magazine having means for retaining and rotating a plurality of like disc records in radial spaced relation about a fixed principal axis with said axis tilted a predetermined angle from horizontal comprising a circular main housing journalled for rotation about said axis and shaped to retain said records in one side thereof, a circular central record support on said one side of said housing co-axial and normal to said axis, a circular outer support on said one side in concentric spaced relation to said central record support, a circular mid-position support on said one side positioned concentric with and spaced between said other supports and displaced a predetermined axial distance therefrom, each said record support having a plurality of equi-spaced different projections therein forming a like plurality of slots therebetween with each of said slots in each said support in radial alignment with said axis for supporting each said record therein by three spaced portions of its edge, a progressive indices on the outer surface of said projections in the said outer record support, two of said indices on each of said projections for identifying opposite sides of each of said records in said magazine.

4. A record player magazine having means for retaining and rotating a plurality of like disc records in radial spaced relation about a fixed principal axis with said axis tilted a predetermined angle for horizontal comprising a main housing journalled for rotation about said axis and shaped to form a semi-toroidal cavity in one side thereof concentric with said axis for retaining said records, a circular inner record support secured concentric with said axis on said housing having a plurality of equi-spaced projections extending into said cavity in a direction away from said axis, a circular midposition record support secured concentric with said axis on said housing having an equal plurality of projections extending into said cavity, a circular outer record support secured concentric with said axis on said housing having an equal plurality of projections extending into said cavity toward said axis, each of said projections on each said support adapted to form slots therebetween in radial alignment with said axis for retaining said records therein in uniform radial spaced relation to each other and said axis with their sides adjacent each other and parallel said axis whereby said records will be retained in said magazine in toroidal formation by the action of gravity by said midposition support and the alternate supporting action of opposite edge portions of said records by said inner and outer supports respectively when said magazine is rotated.

5. A record player magazine and drive therefor for rotating a plurality of disc records about a fixed axis comprising means forming a frame, a circular main housing of said magazine journalled for rotation in said frame about a fixed axis coaxial thereto, said housing constructed and adapted to retain in a front open side thereof a plurality of said records positioned in uniform radial spaced relation to each other and said axis with the sides thereof adjacent each other and parallel said axis, a circular endless tire means secured on said housing concentric with said axis, a drive means including an electric motor in said frame for engaging said tire means and rotating said housing at each of two predetermined speeds when opperated, two friction drive wheels independently journalled on a shifter means in said drive means and positioned for alternate driving engagement with said tire when operated, a transmission means in said drive means coupled to said motor and said wheels for rotating each of the latter at different predetermined speeds when said motor is energized, urging means in said drive means biasing said shifter means for normally engaging one of said wheels with said tire, electric solenoid means in said drive means coupled with said shifter means for moving same to simultaneously disengaging said one wheel from and engaging the other said wheel with said tire when said solenoid is energized for changing the rotational speed of said magazine when said motor is energized.

6. The construction recited in claim 5 including a plurality of radially equi-spaced abutments in said housing corresponding in number and circular position with said records for stopping and registering said magazine in said number of positions, an indexing plunger operatively and resiliently connected to said shifter means for movement into and out of engagement with each of said abutments for stopping said housing after the operation of said shifter whereby the said high speed rotation of said magazine will be reduced to said low speed rotation prior to the stopping thereof by the registration of said plunger with any one of said abutments when said drive means and said solenoid means are operated in predetermined sequence.

7. A drive means for rotating and stopping a magazine retaining a plurality of disc records in each of said plurality of positions with each selected one of said records registered in a predetermined position comprising a means forming a frame, a main housing of said magazine journalled for rotation in said frame about a fixed axis, a circular endless tire secured to said housing in coaxial position about said axis adapted to be driven by a friction drive means, said friction drive means consisting of a high speed drive wheel and low speed drive wheel journalled on a shifter means pivoted for oscillation in said frame with each of said wheels coupled by independent different ratio means to an electric drive motor, said shifter means pivotally positioned to alternately position each of said wheels into driving engagement with said tire when oscillated, electric solenoid means in said frame coupled to said shifter means for normally holding said shifter and said high speed wheel in driving engagement with said tire for driving said magazine at a predetermined high speed when said motor and said solenoid are energized, spring means in said frame associated with said shifter means for moving said high speed wheel from engagement with said tire and moving said low speed wheel into engagement with said tire when said solenoid is de-energized for reducing the said high speed rotation of said magazine to a said low speed rotation.

8. An indexing means for selectively stopping and registering a record magazine of the character described at each of a plurality of positions corresponding to a fixed registration plane comprising means forming a frame, a circular main housing of said magazine journalled for rotation in said frame about fixed axis coaxial thereto, said housing constructed and adapted to retain in a front open side thereof a plurality of said records positioned in uniform radial spaced relation to each other and said axis with the sides thereof adjacent each other and parallel said axis, an electric motor drive means on said frame coupled to said housing for rotating the latter when energized, a plurality of radially equi-spaced like apertures in said housing corresponding in number and circular position with said records, an abutment in said housing at one edge of each of said apertures, an indexing plunger means in said frame for predetermined reciprocating movement positioned to move from a first rest position to a second position against the surface of said housing and to a third registered position in any selected one of said apertures against a corresponding said abutment, spring means biased between said frame and said plunger means for normally urging the latter from said rest position to said second position and into said registered position for engaging said plunger in a selected said aperture, electric solenoid means in said frame coupled to said plunger means for operating same and normally holding the latter against the urging action of said spring means in said rest position when energized and for releasing the said plunger when de-energized and stopping said magazine with a selected said record in said magazine registered with said registration plane.

9. The structure recited in claim 8 including an electric switch and circuit means connected to said motor drive means for operating the latter when said circuit means is energized, said switch positioned for engagement and operation by said plunger means when the latter is moved from its said rest position to its said registered positioned for de-energizing said motor means prior to the registration of said plunger means into a said aperture.

References Cited in the file of this patent

UNITED STATES PATENTS

| | | |
|---|---|---|
| 2,529,019 | Hardy | Nov. 7, 1950 |
| 2,583,954 | Kugler | Jan. 29, 1952 |
| 2,796,263 | Moore | June 18, 1957 |
| 2,804,307 | Rockola | Aug. 27, 1957 |
| 2,826,418 | Johnson | Mar. 11, 1958 |